United States Patent
Yoshida (10) Patent No.: US 9,496,553 B2
(45) Date of Patent: Nov. 15, 2016

(54) PRODUCTION METHOD OF POSITIVE ELECTRODE ACTIVE MATERIAL FOR LITHIUM SECONDARY BATTERY

(75) Inventor: Jun Yoshida, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 298 days.

(21) Appl. No.: 13/515,042

(22) PCT Filed: Dec. 15, 2009

(86) PCT No.: PCT/JP2009/070925
§ 371 (c)(1),
(2), (4) Date: Jun. 11, 2012

(87) PCT Pub. No.: WO2011/074079
PCT Pub. Date: Jun. 23, 2011

(65) Prior Publication Data
US 2012/0280173 A1 Nov. 8, 2012

(51) Int. Cl.
*H01M 4/58* (2010.01)
*C01D 15/00* (2006.01)
(Continued)

(52) U.S. Cl.
CPC ............ *H01M 4/5825* (2013.01); *C01D 15/00* (2013.01); *C01G 45/006* (2013.01);
(Continued)

(58) Field of Classification Search
CPC ............ H01M 4/5825; H01M 10/0525; C01G 45/006; C01G 45/1221; C01D 15/00;
(Continued)

(56) References Cited

U.S. PATENT DOCUMENTS 7,029,795 B2   4/2006 Li
7,147,969 B2   12/2006 Yamada et al.
(Continued)

FOREIGN PATENT DOCUMENTS

CN   101212048   7/2008
CN   101399370   4/2009
(Continued)

OTHER PUBLICATIONS

International Search Report in International Application No. PCT/JP2009/070925; Mailing Date: Feb. 16, 2010.

*Primary Examiner* — Peter F Godenschwager
*Assistant Examiner* — Andrew J Oyer
(74) *Attorney, Agent, or Firm* — Finnegan, Henderson, Farabow, Garrett & Dunner, LLP (57) ABSTRACT

The production method for a positive electrode active material according to the present invention is a method of producing a positive electrode active material for a lithium secondary battery mainly composed of an olivine-type lithium manganese phosphate compound, wherein the olivine-type lithium manganese phosphate compound is a compound represented by the general formula $Li(Mn_aM_{1-a})_ZPO_4$ (where, M represents at least one type selected from the group consisting of Al, Mg, Zr, Nb and Zn, a satisfies the relationship of $0.5 < a \leq 1$, and Z satisfies the relationship of $1.0 < Z \leq 1.1$), and is synthesized by mixing starting raw materials, which are a lithium source, a manganese source and an elemental M source, under a condition in which a molar ratio (charge ratio) X of (Mn+M)/Li is set such that $1.0 < X \leq 1.1$ and $Z \leq X$.

2 Claims, 6 Drawing Sheets (51) Int. Cl.
*C01G 45/00* (2006.01)
*H01M 10/0525* (2010.01)
*C01G 45/12* (2006.01)

(52) U.S. Cl.
CPC ...... *C01G 45/1221* (2013.01); *H01M 10/0525* (2013.01); *C01P 2002/50* (2013.01); *C01P 2002/52* (2013.01); *C01P 2002/72* (2013.01); *C01P 2006/40* (2013.01); *Y02E 60/122* (2013.01); *Y02P 70/54* (2015.11); *Y02T 10/7011* (2013.01)

(58) Field of Classification Search
CPC .............. C01P 2002/72; C01P 2002/50; C01P 2002/52; C01P 2006/40; Y02E 60/122; Y02T 10/7011
USPC ............ 252/182.1, 506, 507, 508, 509; 429/231.1, 231.3, 231.5, 231.6, 231.8
See application file for complete search history.

(56) References Cited

U.S. PATENT DOCUMENTS 8,148,015 B2 * 4/2012 Pan et al. ............... 429/231.1
8,784,694 B2 * 7/2014 Kay .......................... 252/506
2004/0002003 A1 1/2004 Yamada et al.
2005/0053835 A1 3/2005 Atsumi et al.
2009/0081534 A1 3/2009 Takami et al.
2009/0130559 A1 * 5/2009 Okada et al. ............. 429/224
2009/0130560 A1 5/2009 Exnar et al.
2012/0001119 A1 * 1/2012 Meng ....................... 252/182.1

FOREIGN PATENT DOCUMENTS

| | | |
|---|---|---|
| JP | 2002-134112 | 5/2002 |
| JP | 2002-151072 | 5/2002 |
| JP | 2003-257429 | 9/2003 |
| JP | 2004-111068 | 4/2004 |
| JP | 2006-511907 | 4/2006 |
| JP | 2008-130525 | 6/2008 |
| JP | 2008-184346 | 8/2008 |
| JP | 2009-120479 | 6/2009 |
| JP | 2009-527085 | 7/2009 |
| WO | WO 00/60679 | 10/2000 |
| WO | WO 00/60680 | 10/2000 |
| WO | WO 2004/059758 A2 | 7/2004 |
| WO | WO 2007/093856 A1 | 8/2007 |
| WO | WO 2008/018633 A1 | 2/2008 |
| WO | WO 2009/009758 A2 | 1/2009 |
| WO | WO 2009/092098 A2 | 7/2009 |

* cited by examiner

PRODUCTION METHOD OF POSITIVE ELECTRODE ACTIVE MATERIAL FOR LITHIUM SECONDARY BATTERY

CROSS-REFERENCE TO RELATED APPLICATIONS

This application is a national phase application of International Application No. PCT/JP2009/070925, filed Dec. 15, 2009, the content of which is incorporated herein by reference.

TECHNICAL FIELD

The present invention relates to a method of producing a positive electrode active material of a lithium secondary battery. More particularly, the present invention relates to a production method of a positive electrode active material composed of a lithium-containing manganese phosphate compounds. In addition, the present invention relates to a use of a positive electrode active material produced according to the production method.

BACKGROUND ART

Lithium secondary batteries (and typically, lithium ion batteries), which charge and discharge due to migration of lithium ions between a positive electrode and a negative electrode, are expected to continue to increase in demand in the future for use as vehicle-mounted power supplies or as power supplies of personal computers and portable devices because they are lightweight and allow the obtaining of high energy density. In a typical configuration of this type of secondary battery, an electrode is provided having a configuration in which a material capable of reversibly storing and releasing lithium ions (electrode active material) is retained in an electrically conductive member (electrode current collector). An example of an electrode active material used in a positive electrode (positive electrode active material) is a so-called olivine-type lithium manganese phosphate compound (such as $LiMnPO_4$) that contains lithium. Since olivine-type lithium manganese phosphate compounds have a high theoretical capacity, are inexpensive and have superior stability, they are attracting attention as a promising positive electrode active material. Examples of the prior art relating to this type of positive electrode active material include that described in Patent Documents 1 and 2.

Patent Document 1: Japanese Patent Application Laid-open No. 2009-527085

Patent Document 2: Japanese Patent Application Laid-open No. 2009-120479

Production of an olivine-type lithium manganese phosphate compound as described above is carried out by using, for example, a sol-gel method. For example, Patent Document 1 describes the production of $LiMnPO_4$ by weighing out and mixing starting raw materials consisting of a lithium compound and manganese compound at a molar ratio (namely, stoichiometric ratio) Mn/Li of 1, and then synthesizing $LiMnPO_4$ by a sol-gel process. However, according to studies carried out by the inventor of the present application, in a lithium secondary battery that uses $LiMnPO_4$ obtained according to such a process as a positive electrode active material, it was determined that the resulting capacity is not as high as expected.

DISCLOSURE OF THE INVENTION

With the foregoing in view, a primary object of the present invention is to provide a method of preferably producing a high-performance positive electrode active material (olivine-type lithium manganese phosphate compound) that contributes to the construction of a lithium secondary battery having superior battery characteristics (and particularly, battery capacity). In addition, another object of the present invention is to provide a lithium secondary battery constructed using a positive electrode active material produced according to the method disclosed herein.

As a result of conducting extensive studies, the inventor of the present application found that, when a lithium secondary battery is assembled by using for the positive electrode active material an olivine-type lithium manganese phosphate compound ($LiMnPO_4$) having a molar ratio (stoichiometric ratio) Mn/Li of 1, the Mn escapes from the positive electrode active material during the course of battery assembly (namely, the Mn/Li ratio of the positive electrode active material in the battery after assembly becomes less than 1). In the case of $LiMnPO_4$, $Mn^{2+}$ is oxidized to $Mn^{3+}$ or $Mn^{4+}$ simultaneous to the release of Li during the course of charging. Consequently, when Mn escapes from the positive electrode active material in a battery after assembly (when the Mn/Li ratio of the positive electrode active material becomes less than 1), the amount of Mn able to participate in the battery reaction decreases, thereby causing a decrease in the capacity of the lithium secondary battery as a result thereof.

On the basis of this finding, the present invention improves battery characteristics (and particularly, battery capacity) of a lithium secondary battery by adopting the approach of compensating for the loss of Mn that has escaped from the positive electrode active material during assembly and maintaining the Mn/Li ratio of the positive electrode active material in the assembled battery at the ideal value of 1 or more.

Namely, the method provided by the present invention is a method of producing a positive electrode active material for a lithium secondary battery that is mainly composed of an olivine-type lithium manganese phosphate compound, wherein the olivine-type lithium manganese phosphate compound is a compound represented by the following general formula (II):

$$LiMn_ZPO_4 \quad (II)$$

(where, Z satisfies the relationship $1.0 < Z \le 1.1$), and is synthesized by mixing starting raw materials, which are a lithium source and a manganese source, under a condition in which a molar ratio (charge ratio) X of Mn/Li is set such that $1.0 < X \le 1.1$ and $Z \le X$.

According to the production method of the present invention, since synthesis is carried out by mixing starting raw materials, which are a lithium source and a manganese source, under a condition in which the molar ratio (charge ratio) X of Mn/Li is set such that $1.0 < X \le 1.1$, at the time of the synthesized positive electrode active material, Mn is present in excess with respect to Li (namely, a composition results in which the Mn/Li ratio of the positive electrode active material is greater than 1). Due to this excess amount of Mn, the lost amount of Mn that has escaped from the positive electrode active material in the battery after assembly can be compensated, thereby making it possible to maintain the Mn/Li ratio of the positive electrode active material in the battery after assembly at an ideal value of 1 or more. As a result, the battery characteristics (and particularly, battery capacity) of the lithium secondary battery can be improved.

The molar ratio (charge ratio:compounding ratio, by mole) X of Mn/Li during the above-mentioned synthesis is roughly within the range of 1.0<X≤1.1. If the charged amount of the manganese source is excessively low, the Mn that escapes from the positive electrode active material during assembly cannot be adequately compensated, which may cause a decrease in battery capacity. On the other hand, if the charged amount of the manganese source is excessively high, the crystal structure of the positive electrode active material after production is destroyed, which may result in the formation of impurities such as $MnO_2$. Thus, the molar ratio (charge ratio) X of Mn/Li during synthesis is suitably within the range of about 1.0<X≤1.1, normally preferably within the range of 1.01≤X≤1.08, and more preferably within the range of, for example, 1.01≤X≤1.05.

In a preferable aspect of the production method disclosed herein, the synthesis is carried out by a sol-gel method. The use of a sol-gel method enables synthesis of the positive electrode active material to be carried out stably even in the case of using an excess amount of the manganese source relative to the lithium source (namely, so that the molar ratio of Mn/Li becomes 1.0<X≤1.1).

The technical idea described above can be similarly applied to an olivine-type lithium manganese phosphate compound of a composition in which a portion of Mn has been substituted with a subsequently defined M, and similar actions and effects can be realized.

Namely, according to the present invention, a method is provided for producing a positive electrode active material for a lithium secondary battery composed mainly of an olivine-type lithium manganese phosphate compound, wherein the olivine-type lithium manganese phosphate compound is represented by the following general formula (I):

$$Li(Mn_aM_{1-a})_ZPO_4 \qquad (I)$$

(wherein, M represents at least one type selected from the group consisting of Al, Mg, Zr, Nb and Zn, a satisfies the relationship of 0.5<a≤1, and Z satisfies the relationship of 1.0<Z≤1.1).

In the above-mentioned production method, synthesis is carried out by mixing starting raw materials, which are a lithium source, a manganese source and an elemental M source, under a condition in which the molar ratio (charge ratio) X of (Mn+M)/Li is set such that 1.0<X≤1.1 and Z≤X. In this case, the charge ratio of Mn/M is set so that Mn/M after production becomes the ratio of the above-mentioned general formula. Normally, Mn/M is set to roughly be the ratio of a/(1−a).

In addition, according to the present invention, a lithium secondary battery (and typically, a lithium ion battery) is provided in which a positive electrode active material produced according to any of the methods disclosed herein is provided for the positive electrode. Since this lithium secondary battery is constructed using a positive electrode active material composed of the above-mentioned olivine-type lithium manganese phosphate compound in the positive electrode, it demonstrates more favorable battery characteristics (for example, battery capacity).

This type of lithium secondary battery is preferable for use as a lithium secondary battery installed in a vehicle such as an automobile. Thus, according to the present invention, a vehicle is provided that is provided with the lithium secondary battery disclosed herein (which may also be in the form of an assembled battery in which a plurality of lithium secondary batteries are connected). In particular, since this lithium secondary battery allows the obtaining of high capacity, a vehicle (such as an automobile) is provided that is provided with the lithium secondary battery as a motive power supply (and typically, a motive power supply of a hybrid vehicle or electric vehicle).

DESCRIPTION OF EMBODIMENTS

The following provides an explanation of embodiments according to the present invention while referring to the drawings. In the drawings described to follow, those members or sites that demonstrate the same actions are explained by indicating with the same reference symbols. Furthermore, the dimensional relationships (such as length, width and thickness) in each of the drawings are not intended to reflect actual dimensional relationships. In addition, those matters required for carrying out the present invention other than those matters specifically mentioned in the present description (such as the configuration and production method of an electrode body provided with a positive electrode and negative electrode, the configuration and production method of a separator and electrolyte, or general technical matters relating to construction of the lithium secondary battery and other batteries) can be understood to be design matters for a person with ordinary skill in the art based on the prior art in the relevant field.

Although the following provides an explanation focusing on the production of a positive electrode active material mainly composed of an olivine-type lithium manganese phosphate compound represented by the above-mentioned formula (II) (namely, when a=1 in the above-mentioned formula (I)), this is not intended to limit the scope of the present invention.

The method provided according to the present embodiment is a method of producing a positive electrode active material for a lithium secondary battery that is mainly composed of an olivine-type lithium manganese phosphate compound. The olivine-type lithium manganese phosphate compound is a compound represented by the general formula $LiMn_ZPO_4$, wherein Z satisfies the relationship of 1.0<Z≤1.1. In this production method, synthesis is carried out by mixing starting raw materials, which are a lithium source and a manganese source, under conditions in which the molar ratio (charge ratio) X of Mn/Li is set such that $1.0<X\leq1.1$ and $Z\leq X$. Namely, as a result of mixing an excess amount of the manganese source (an amount greater than 1 mol but less than or equal to 1.1 mol) with respect to 1 mol of the lithium source, and reacting an excess amount of the manganese source with the lithium source, an olivine-type lithium manganese phosphate compound is synthesized in which Mn is present in excess with respect to Li (namely, a composition results in which the Mn/Li ratio is 1 or more).

Here, in a conventional aspect in which a lithium source and a manganese source are mixed under conditions in which the molar ratio (charge ratio) X of Mn/Li is 1.0, Mn and Li are typically present in the same molar ratio (namely, the Mn/Li ratio is 1) at the time of the synthesized olivine-type lithium manganese phosphate compound ($LiMnPO_4$). However, when a lithium secondary battery is assembled using the olivine-type lithium manganese phosphate compound ($LiMnPO_4$) for the positive electrode active material, a phenomenon occurs in which Mn escapes from the positive electrode active material during the course of battery assembly (namely, the Mn/Li ratio of the positive electrode active material in the battery after assembly becomes less than 1). When Mn escapes from the positive electrode active material in the battery after assembly, since the amount of Mn able to participate in the battery reaction decreases, this causes a decrease in the capacity of the lithium secondary battery as a result thereof.

In contrast, according to the production method of the present embodiment, since synthesis is carried out by mixing starting raw materials, which are a lithium source and a manganese source, under conditions in which the molar ratio (charge ratio:the molar ratio before the synthesis) X of Mn/Li is set such that $1.0<X\leq1.1$, Mn is present in excess relative to Li (namely, the Mn/Li ratio of the positive electrode active material is greater than 1) at the time of the synthesized positive electrode active material. The loss of Mn that has escaped from the positive electrode active material during assembly can be compensated by this excess amount, thereby making it possible to maintain the Mn/Li ratio of the positive electrode active material in the assembled battery at an ideal value of 1 or more. As a result, battery characteristics (and particularly, battery capacity) of the lithium secondary battery can be improved.

The molar ratio (charge ratio) X of Mn/Li at the time of the synthesis is roughly within the range of $1.0<X\leq1.1$. If the charged amount of the manganese source is excessively low, the Mn that escapes from the positive electrode active material during assembly cannot be adequately compensated, which may cause a decrease in battery capacity. On the other hand, if the charged amount of the manganese source is excessively high, the crystal structure of the positive electrode active material after production is destroyed, which may result in the formation of impurities such as $MnO_2$. Thus, the molar ratio (charge ratio) X of Mn/Li during synthesis is suitably within the range of roughly $1.0<X\leq1.1$, normally preferably within the range of $1.01\leq X\leq1.08$, and more preferably within the range of, for example, $1.01\leq X\leq1.05$.

Furthermore, in the aspect of the present embodiment, Mn is present in excess relative to Li at the time of the synthesized positive electrode active material, and the loss of Mn that has escaped from the positive electrode active material during assembly is compensated by this excess amount. Consequently, the composition of the positive electrode active material at the time of synthesis differs from the composition of the positive electrode active material in the battery after assembly. In a preferable technology disclosed herein, the relationship between the molar ratio (charge ratio) X of Mn/Li of the positive electrode active material at the time of synthesis and a molar ratio Y of Mn/Li of the positive electrode active material in the battery after assembly can typically satisfy the relationship of $1.0<Y\leq X$, and normally satisfy the relationship of $1.0\ Y<X$.

Furthermore, Mn that has escaped from the positive electrode active material during battery assembly is thought to elute into the electrolyte solution. Thus, by quantitatively measuring the Mn contained in the electrolyte solution in the assembled battery and the Mn remaining in the positive electrode active material, the approximate amount of the manganese source used during synthesis (and in turn, the charge ratio of Mn/Li) can be determined.

There are no particular limitations on the lithium source provided it is able to form a desired lithium manganese phosphate compound by final baking. Examples of lithium sources that can be used include an elemental metal, oxides and various types of compounds (such as acetates, oxalates or carbonates). Specific examples include lithium acetate dihydrate, lithium nitrate and lithium hydroxide. A particularly preferable example is lithium acetate dihydrate since it is readily soluble in aqueous solvents. Furthermore, the above-mentioned lithium sources may be respectively used alone or two or more types may be used in combination.

There are no particular limitations on the manganese source provided it is able to form a desired lithium manganese phosphate compound by final baking. Examples of manganese sources that can be used include elemental metal, oxides and various types of compounds (such as acetates, oxalates or carbonates). Specific examples of manganese sources include manganese acetate tetrahydrate, manganese nitrate hexahydrate and manganese sulfate pentahydrate. A particularly preferable example is manganese acetate tetrahydrate since it is readily soluble in aqueous solvents. Furthermore, the above-mentioned manganese sources may be respectively used alone or two or more types may be used in combination.

In addition, a phosphorous source can be used as a starting raw material in addition to the lithium source and the manganese source. There are no particular limitations on the phosphorous source provided it is able to form a desired lithium manganese phosphate compound by final baking. Examples of phosphorous sources include organic compounds such as ammonium dihydrogen phosphate or diammonium hydrogen phosphate. Alternatively, phosphoric acid or a phosphorous-containing solution containing phosphoric acid may also be used. The charge ratio of the phosphorous source is that of the stoichiometric ratio, and 1 mol of the phosphorous source can be mixed with 1 mol of the lithium source. Furthermore, the above-mentioned phosphorous sources may be respectively used alone or two or more types may be used in combination.

Once the raw material compounds (lithium source, manganese source and phosphorous source) have been mixed at the mixing ratios described above, a lithium manganese phosphate compound is synthesized.

There are no particular limitations on the method used to synthesize the lithium manganese phosphate compound provided it is a method that allows the raw material compounds to adequately react. For example, a solid phase reaction method, liquid phase reaction method (such as a sol-gel method) or a vapor phase reaction method may be used. There are no particular limitations on the reaction conditions, and are suitably selected corresponding to the synthesis method so that the raw material compounds are able to suitably react.

In a preferable aspect of the technology disclosed herein, the synthesis is carried out by a sol-gel method. The use of a sol-gel method enables synthesis to be carried out stably even in the case of using an excess amount of Mn, and enables a desired positive electrode active material (olivine-type lithium manganese phosphate compound) to be obtained.

In the synthesis of the lithium manganese phosphate compound by a sol-gel method, the raw material compounds are first dissolved in a suitable solvent to prepare a raw material mixed liquid. Distilled water, for example, can be used for the solvent used in the raw material mixed liquid. A chelating agent and the like can also be added to the raw material mixed liquid in addition to the raw material compounds as necessary.

Once the raw material mixed liquid has been prepared, the raw material mixed liquid is heated to volatilize the solvent and obtain a gel-like composition. The heating temperature is lower than the volatilization temperature of the solvent of the raw material mixed liquid, and the raw material mixed liquid is preferably heated at, for example, 70° C. to 90° C. The heating time is required to be the amount of time until the gel-like composition is formed from the raw material mixed liquid, and is normally 8 hours to 24 hours. There are no particular limitations on heating means, and arbitrary heating means such as a hot plate can be employed.

Once the gel-like composition has been obtained, the gel-like composition is placed in a container and allowed to react by baking at a prescribed temperature. The baking temperature is the temperature at which the various ions in the gel-like composition are able to adequately react, and baking is preferably carried out at, for example, about 300° C. to 700° C. The baking time is the amount of time until each of the ions in the gel-like composition uniformly react, and is normally 1 hour to 10 hours. There are no particular limitations on baking means, and arbitrary baking means such as an electric heating oven can be employed. Although the reaction atmosphere during baking is, for example, an air atmosphere, baking can also be carried out in an inert gas atmosphere or oxygen gas atmosphere as necessary.

The baking can also be carried out a plurality of times as necessary. Namely, in carrying out baking as described above, after first pre-baking at a comparatively low temperature range (for example, 300° C. to 400° C.) and then temporarily crushing the pre-baked product, main baking is carried out at a higher temperature range (for example, 500° C. to 700° C.). In this manner, by first carrying out pre-baking at a lower temperature range followed by main baking at a higher temperature range, the phenomenon in which crystals of the lithium manganese phosphate compound grow to become excessively large can be avoided as compared with the case of continuously baking the gel-like composition at a constant high temperature (for example, 500° C. to 700° C.), thereby facilitating the production of a positive electrode active material that contains a lithium manganese phosphate compound having a crystal size that contributes to improvement of battery performance (for example, improvement of rapid charging and discharging characteristics). In addition, this is also advantageous from the viewpoint of enhancing homogeneity of the ultimately obtained positive electrode active material. The procedure of crushing the pre-baked product and re-baking may be carried out repeatedly prior to main baking.

In addition, main baking may also be carried out after mixing the pre-baked product with an electrically conductive material. In this case, since main baking is carried out after having adhered an electrically conductive material to the surface of the pre-baked product, a powder of a lithium manganese phosphate compound (positive electrode active material)-electrically conductive composite material (positive electrode material) can be obtained. A carbon-based material, for example, is used preferably for the electrically conductive material. Examples of such carbon materials include carbon black (acetylene black (AB)) and carbon fibers. Although there are no particular limitations thereon, a preferable amount of the electrically conductive material used at this time is about 1% by weight to 30% by weight, and normally preferably 5% by weight to 25% by weight, based on the total weight of the pre-baked product.

Crushing of the pre-baked product can be carried out using an ordinary ball mill apparatus. At that time, the electrically conductive material is mixed into the pre-baked product, and by applying mechanical stress with a ball mill and the like, the electrically conductive material can be adhered to the surface of the pre-baked product (pre-baked product particles). Subsequently, the resulting pre-baked product particles adhered with the electrically conductive material are subjected to main baking at 500° C. to 700° C. to obtain the positive electrode active material-electrically conductive composite material powder (positive electrode material).

In this manner, production of the olivine-type lithium manganese phosphate compound (positive electrode active material powder) according to the present embodiment is completed. Furthermore, although the above-mentioned example indicated the case of synthesizing the positive electrode active material using a sol-gel method based on Mn/Li being greater than 1 and equal to or less than 1.1, the synthesis method is not limited to a sol-gel method. For example, a positive electrode active material can also be synthesized using a co-precipitation method or hydrothermal synthesis method based on Mn/Li being greater than 1 and equal to or less than 1.1.

Figure 1:
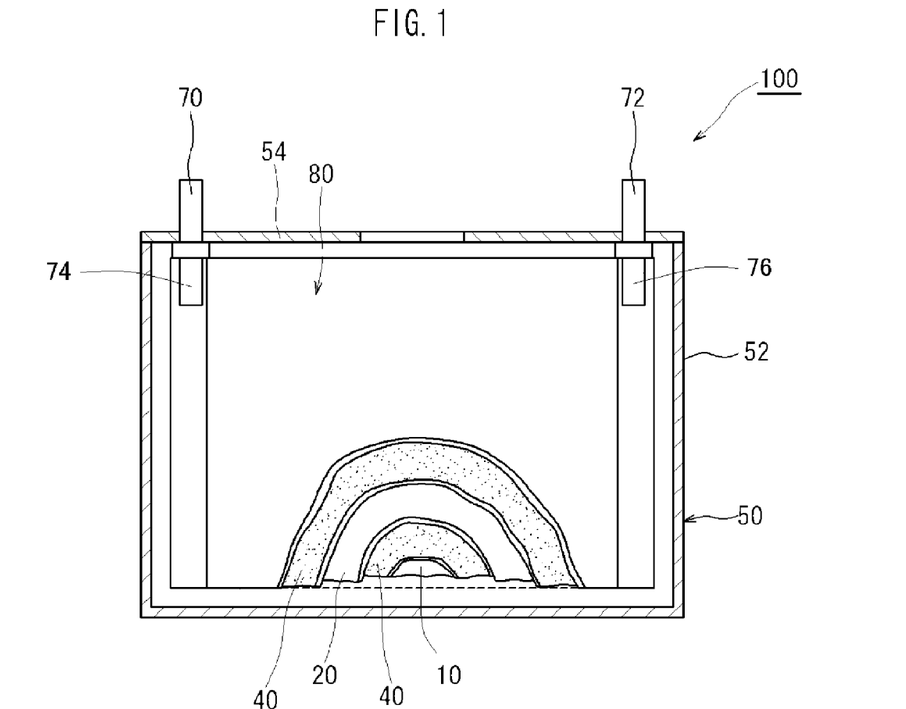
FIG. 1 is a drawing schematically showing a lithium secondary battery according to an embodiment of the present invention.

The following provides an explanation of an embodiment of a lithium secondary battery provided with a lithium manganese phosphate compound (positive electrode active material) produced by applying the previously described method in the positive electrode with reference to the schematic diagram shown in FIG. 1.

As shown in the drawing, a lithium secondary battery 100 according to the present embodiment has a configuration in which an electrode body (wound electrode body) 80, having a form in which a long positive electrode sheet 10 and a long negative electrode sheet 20 are wound into a flat shape with a long separator 40 interposed there between, is housed in a container 50 of a shape (flat box-like shape) able to house the wound electrode body 80 along with a non-aqueous electrolyte solution not shown.

The container 50 is provided with a flat, cubical container body 52, the upper end of which is open, and a lid 54 that covers the opening. A metal material such as aluminum or steel is preferably used for the material that composes the container 50 (aluminum is used in the present embodiment). Alternatively, the container 50 may also be formed from a resin material such as polyphenylene sulfide (PPS) or polyimide resin. A positive electrode terminal 70 electrically connected to the positive electrode of the wound electrode body 80, and a negative electrode terminal 72 electrically connected to the negative terminal 20 of the wound electrode body 80 are provided on the upper surface of the container 50 (namely, the lid 54). Inside the container 50, the flat wound electrode body 80 is housed together with a non-aqueous electrolyte solution not shown.

Figure 2:
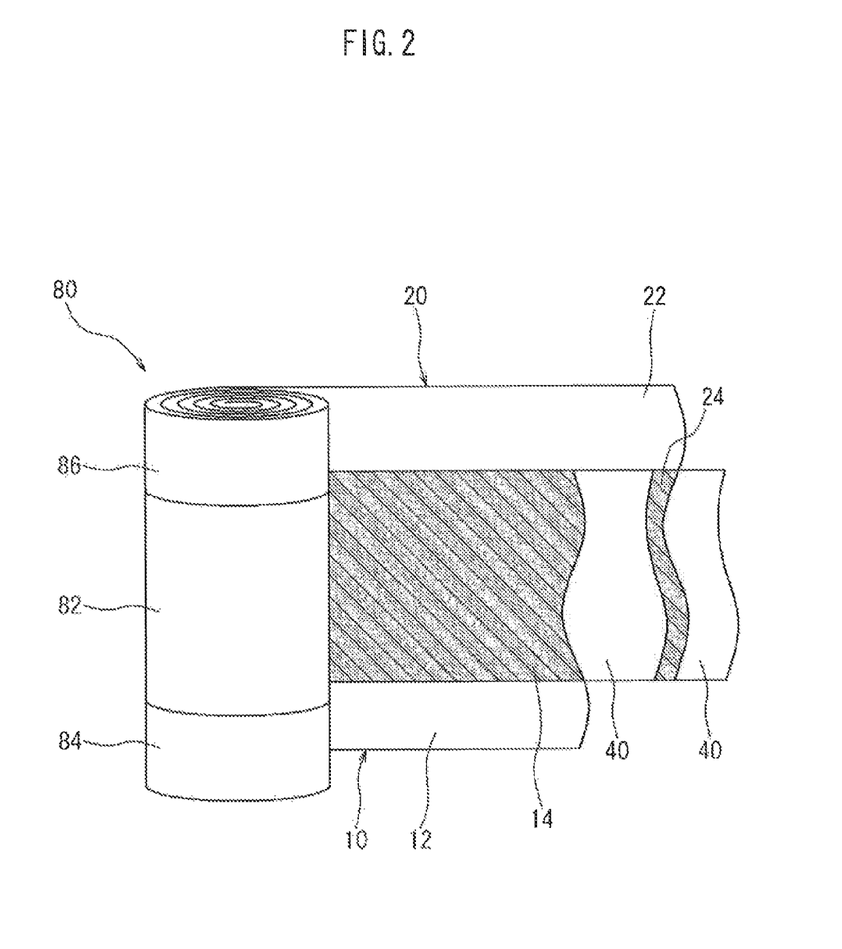
FIG. 2 is a drawing schematically showing an electrode body of a lithium secondary battery according to an embodiment of the present invention.

The wound electrode body 80 according to the present embodiment is similar to a wound electrode body of an ordinary lithium secondary battery, and as shown in FIG. 2, has a structure of a long (band-shaped) sheet at the stage prior to assembly of the wound electrode body 80.

The positive electrode sheet 10 has a structure in which a positive electrode mixed material layer 14 containing a positive electrode active material (lithium manganese phosphate compound obtained according to the production method of the present embodiment) is retained on both sides of a long, sheet-like and foil-like positive electrode current collector (to be referred to as a "positive electrode current collector foil") 12. However, the positive electrode mixed material layer 14 is not adhered to one edge in the direction of width of the positive electrode sheet 10 (lower edge in the drawing), resulting in the formation of a non-positive electrode mixed material layer-forming portion where a prescribed width of the positive electrode current collector 12 is exposed.

The positive electrode mixed material layer 14 can contain one type or two or more types of materials able to be used as constituent components of a positive electrode mixed material layer in an ordinary lithium secondary battery as necessary. An electrically conductive material is an example of such a material. A carbon-based material such as carbon powder or carbon fibers is preferably used for the electrically conductive material. Alternatively, an electrically conductive metal powder such as nickel powder may also be used. In addition, examples of materials able to be used as components of the positive electrode mixed material layer include various types of polymer materials able to function as a binder of the above-mentioned constituent materials.

The negative electrode sheet 20 also has a structure in which a negative electrode mixed material layer 24 containing a negative electrode active material is retained on both sides of a long, sheet-like and foil-like negative electrode current collector (to be referred to as a "negative electrode current collector foil") 22 in the same manner as the positive electrode sheet 10. However, the negative electrode mixed material layer 24 is not adhered to one edge in the direction of width of the negative electrode sheet 20 (upper edge in the drawing), resulting in the formation of a non-negative electrode mixed material layer-forming portion where a prescribed width of the negative electrode current collector 22 is exposed.

When producing the wound electrode body 80, the positive electrode sheet 10 and the negative electrode sheet 20 are laminated with the separator sheets 40 interposed therebetween. The positive electrode sheet 10 and the negative electrode sheet 20 are superimposed while slightly shifted in the direction of width so that the non-positive electrode mixed material layer-forming portion of the positive electrode sheet 10 and the non-negative electrode mixed material layer-forming portion of the negative electrode sheet 20 respectively protrude from both ends in the direction of width of the separator sheets 40. The flat wound electrode body 80 can then be produced by winding the laminate superimposed in this manner and flattening the resulting wound body by crushing from both sides.

A wound core portion 82 (namely, the portion where the positive electrode mixed material layer 14 of the positive electrode sheet 10, the negative electrode mixed material layer 24 of the negative electrode sheet 20, and the separator sheets 40 are tightly wound) is formed in the central portion of the wound electrode body 80 in the direction of the winding axis. In addition, the non-electrode mixed layer-forming portions of the positive electrode sheet 10 and the negative electrode sheet 20 respectively protrude to the outside from the wound core portion 82 on both ends of the electrode body 80 in the direction of the winding axis. A positive electrode lead terminal 74 and a negative electrode lead terminal 76 are respectively provided on the positive electrode side protruding portion (namely, the portion where the positive electrode mixed layer 14 is not formed) 84 and the negative electrode side protruding portion (namely, the portion where the negative electrode mixed layer 24 is not formed) 86, and are respectively electrically connected to the above-mentioned positive electrode terminal 70 and the negative electrode terminal 72.

Constituents other than the positive electrode sheet 10 that compose the wound electrode body 80 may be the same as those of a wound electrode body of a conventional lithium ion battery, and there are no particular limitations thereon. For example, the negative electrode sheet 20 can be formed by imparting the negative electrode mixed material layer 24 composed mainly of a negative electrode active material for a lithium ion battery on the long negative electrode current collector 22. Copper foil or other metal foil suitable for use as a negative electrode is preferably used for the negative electrode current collector 22. One type or two or more types of materials conventionally used in lithium secondary batteries can be used without any particular limitations for the negative electrode active material. Preferable examples thereof include carbon-based materials such as graphitic carbon or amorphous carbon, and lithium-containing transition metal oxides and transition metal nitrides.

The positive electrode sheet 10 can be formed by imparting the positive electrode mixed material layer 14 composed mainly of a positive electrode active material for a lithium ion battery onto the long positive electrode current collector 12. Aluminum foil or other metal foil suitable for use in a positive electrode is used for the positive electrode current collector 12. $LiMnPO_4$ obtained according to the production method of the present embodiment is used for the positive electrode active material.

Preferable examples of the separator sheets 40 used between the positive and negative electrode sheets 10 and 20 include those composed of a porous polypropylene-based resin. Furthermore, in the case of using a solid electrolyte or gel-like electrolyte for the electrolyte, separators may not be required (namely, in this case, the electrolyte per se can function as a separator).

The wound electrode body 80 configured in this manner is housed in the container body 52, and a suitable non-aqueous electrolyte solution is arranged (injected) in the container body 52. A non-aqueous electrolyte solution similar to a non-aqueous electrolyte solution used in a conventional lithium secondary battery can be used without any particular limitations for the non-aqueous electrolyte solution housed in the container body 52 together with the wound electrode body 80. This non-aqueous electrolyte typically has a composition in which a supporting salt is contained in a suitable non-aqueous solvent. Examples of non-aqueous solvents that can be used include ethylene carbonate (EC), ethyl methyl carbonate (EMC), dimethyl carbonate (DMC), diethyl carbonate (DEC) and propylene carbonate (PC). In addition, a lithium salt such as $LiPF_6$, $LiBF_4$, $LiAsF_6$ or $LiCF_3SO_3$ can be preferably used for the supporting salt.

Construction (assembly) of the lithium ion battery 100 according to the present embodiment is completed by housing the non-aqueous electrolyte solution in the container body 52 together with the wound electrode body 80, and sealing the opening of the container body 52 by welding the lid 54. Furthermore, the process for sealing the container body 52 and the process for arranging (injecting) the electrolyte solution can be carried out in the same manner as techniques carried out in the production of a conventional lithium secondary battery. Subsequently, conditioning (initial charging and discharging) is carried out on the battery. Processes such as gas venting and quality inspections may also be carried out as necessary.

Since the lithium secondary battery 100 constructed in this manner is provided with a high-performance positive electrode active material (lithium manganese phosphate compound) obtained according to the production method of the present embodiment in the positive electrode thereof, it demonstrates superior battery performance (and particularly, battery capacity).

Although the following provides a more detailed explanation of the present invention based on Examples 1 to 4, the present invention is not limited to these Examples 1 to 4.

<Synthesis of Lithium Manganese Phosphate Compound>

Figure 3:
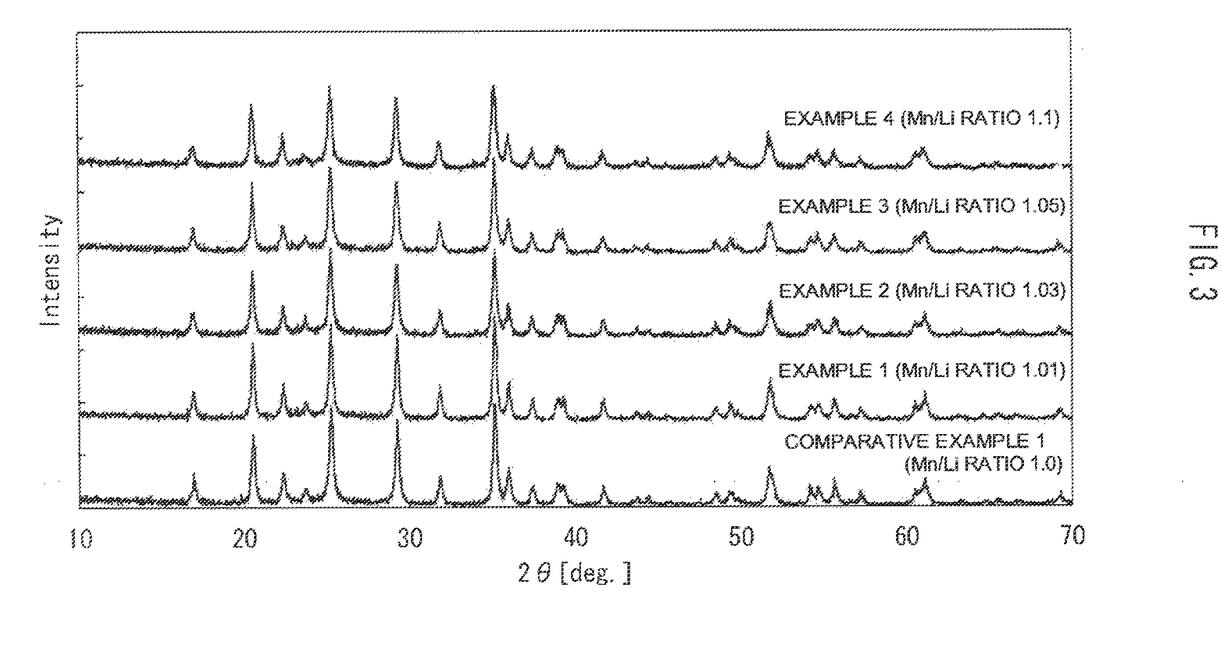
FIG. 3 is a characteristics diagram showing X-ray diffraction patterns according to Examples 1 to 4 and Comparative Example 1.

In Example 1, lithium acetate dihydrate (lithium source), manganese acetate tetrahydrate (manganese source) and ammonium dihydrogen phosphate (phosphorous source) were weighed out to a molar ratio of 1.00:1.01:1.00 (Mn/Li charging ratio=1.01) followed by dissolving in water to prepare a raw material mixed liquid. Next, the raw material mixed liquid was heated to about 80° C. to volatilize the water and obtain a gel-like composition. This gel-like composition was then pre-baked at 350° C., and the resulting pre-baked product was temporarily crushed. Crushing of the pre-baked product was carried out using an ordinary ball mill apparatus. At that time, carbon black as an electrically conductive material was weighed out to a weight ratio of the pre-baked product to the carbon black of 80:20 and then mixed into the pre-baked product to adhere the carbon black to the surface of the pre-baked product. These pre-baked product particles adhered with carbon black were then subjected to main baking at 600° C. This baked product was then crushed to a suitable particle diameter with a ball mill to obtain a powder of a composite material containing a lithium manganese phosphate compound as a positive electrode active material and carbon black as an electrically conductive material (positive electrode active material-electrically conductive composite material powder). Furthermore, when the X-ray diffraction pattern of the resulting composite material powder was measured, it was confirmed to be a powder containing lithium manganese phosphate having the same crystal structure as LiMnPO$_4$ as shown in FIG. 3.

In addition, in Examples 2 to 4 and Comparative Examples 1 and 2, positive electrode active material powders adhered with carbon black (positive electrode active material-electrically conductive composite material powders) were produced by changing the Mn/Li charge ratio as shown in the following Table 1. The positive electrode active material powders adhered with carbon black were produced in the same manner as Example 1 with the exception of changing the conditions of the charge ratio. When X-ray diffraction patterns of the resulting positive electrode active material powders of Examples 2 to 4 and Comparative Example 1 were measured, all were confirmed to be powders having the same crystal structure as LiMnPO$_4$.

[Table 1]

TABLE 1

|  | Mn/Li ratio (charge ratio) | 1/20 C capacity (mAh/g) | 1 C capacity (mAh/g) | 5 C capacity (mAh/g) |
| --- | --- | --- | --- | --- |
| Comp. Ex. 1 | 1 | 121 | 110 | 69 |
| Ex. 1 | 1.01 | 145 | 133 | 109 |
| Ex. 2 | 1.03 | 150 | 132 | 100 |
| Ex. 3 | 1.05 | 151 | 138 | 96 |
| Ex. 4 | 1.1 | 130 | 119 | 85 |
| Comp. Ex. 2 | 1.2 | 100 | 75 | 50 |

<Construction of Lithium Secondary Batteries>

Lithium secondary batteries were constructed using the positive electrode active material powders adhered with carbon black of each of the examples obtained in the manner described above. More specifically, each positive electrode active material powder adhered with carbon black, additional carbon black (electrically conductive material) and polyvinylidene fluoride (PVdF) as binder were weighed out to a weight ratio of 75:20:5 and mixed in N-methylpyrrolidone (NMP) to prepare paste-like positive electrode mixed material layer compositions. Each of these paste-like positive electrode mixed material layer compositions was coated in layered form onto one side of aluminum foil (positive electrode current collector) to obtain positive electrode sheets in which the positive electrode mixed material layer was provided on one side of the positive electrode current collector.

Figure 4:
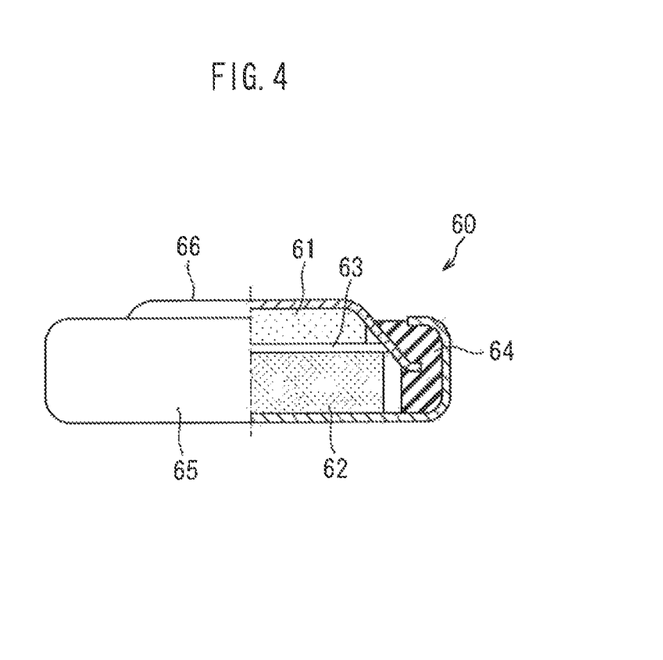
FIG. 4 is a drawing schematically showing a test battery according to Examples 1 to 4 and Comparative Examples 1 and 2.

Each of the positive electrode sheets was stamped out into the shape of a circle having a diameter of 16 mm to produce a positive electrode. This positive electrode (working electrode), metal lithium (using metal Li foil having a diameter of 19 mm and thickness of 0.02 mm) serving as a negative electrode (counter electrode), and a separator (using a porous polypropylene sheet having a diameter of 22 mm and thickness of 0.02 mm) were incorporated in a stainless steel container together with a non-aqueous electrolyte solution to construct a coin cell 60 (half cell for evaluating charging and discharging performance) shown in FIG. 4 having a diameter of 20 mm and thickness of 3.2 mm (type 2032 coil cell battery). In FIG. 4, reference symbol 61 indicates the positive electrode (working electrode), reference symbol 62 indicates the negative electrode (counter electrode), reference symbol 63 indicates a separator impregnated with an electrolyte solution, reference symbol 64 indicates a gasket, reference symbol 65 indicates the container (negative electrode terminal), and reference symbol 66 indicates a lid (positive electrode terminal). Furthermore, a non-aqueous electrolyte containing LiPF$_6$ as a supporting salt at a concentration of about 1 mol/liter in a mixed solvent containing ethylene carbonate (EC), dimethyl carbonate (DMC) and ethyl methyl carbonate (EMC) at a volume ratio of 3:3:4 was used for the non-aqueous electrolyte.

<Charge/Discharge Test>

Figure 6:
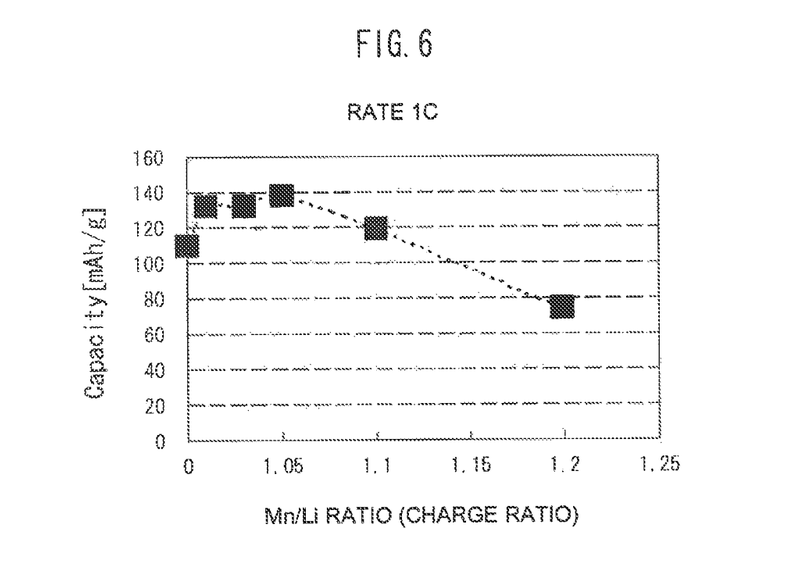
FIG. 6 is a characteristics diagram indicating battery capacity at a discharge rate of 1 C of a test battery according to Examples 1 to 4 and Comparative Examples 1 and 2.
Figure 7:
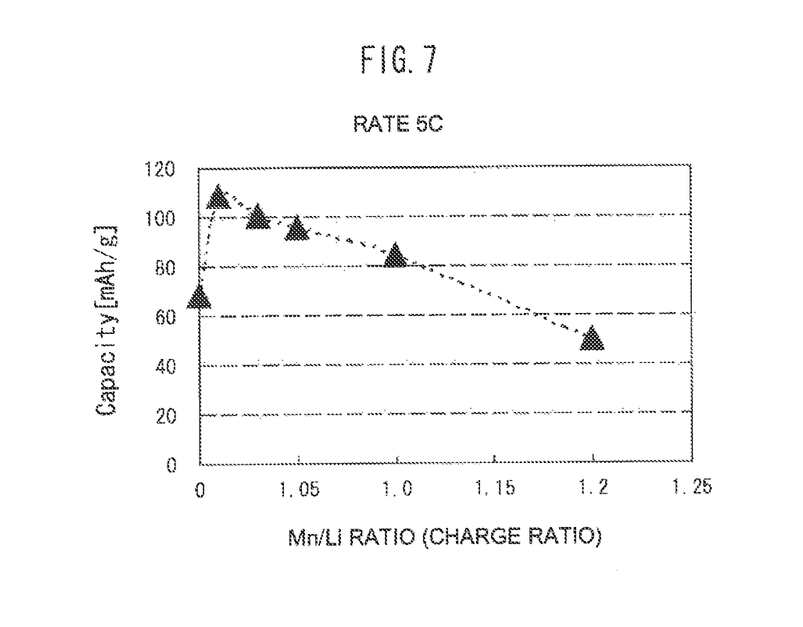
FIG. 7 is a characteristics diagram indicating battery capacity at a discharge rate of 5 C of a test battery according to Examples 1 to 4 and Comparative Examples 1 and 2.

A charge/discharge test was carried out on each of the test lithium secondary batteries of Examples 1 to 4 and Comparative Examples 1 and 2 obtained in the manner described above. More specifically, each of the test lithium secondary batteries was charged at a constant current of 1/20 C to an inter-terminal voltage of 4.8 V under temperature conditions of 25° C., followed by charging at a constant voltage until the total charging time reached 35 hours. Each of the batteries following this CC-CV charging was then discharged at a constant current of 1/20 C to an inter-terminal voltage of 2 V under temperature conditions of 25° C., followed by measurement of discharge capacity at 1/20 C. Those results are shown in Table 1 and FIG. 5. In addition, discharge capacity at 1 C was measured by changing the constant current conditions during discharge to 1 C. Those results are shown in Table 1 and FIG. 6. Moreover, discharge capacity at 5 C was measured by changing the constant current conditions during discharge to 5 C. Those results are shown in Table 1 and FIG. 7.

Figure 5:
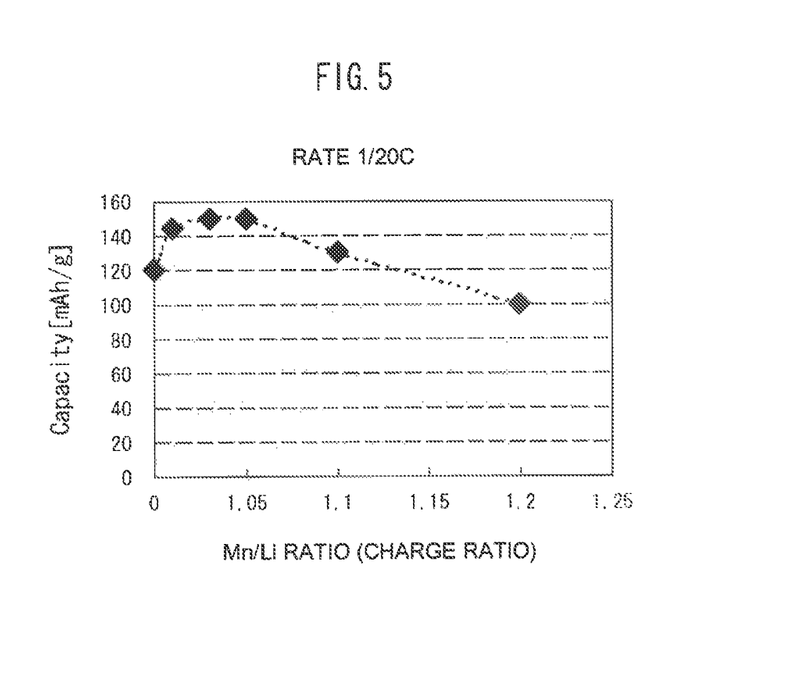
FIG. 5 is a characteristics diagram indicating battery capacity at a discharge rate of 1/20 C of a test battery according to Examples 1 to 4 and Comparative Examples 1 and 2.

As can be seen from Table 1 and FIG. 5 (1/20 C), in contrast to discharge capacity being roughly 120 mAh/g in Comparative Example 1 in which Mn was not mixed in excess, discharge capacity clearly improved in Examples 1 to 4, in which Mn was mixed in excess, demonstrating discharge capacities in excess of 130 mAh/g in all cases, with high capacities of 150 mAh/g or more obtained in Examples 2 and 3 in particular. On the basis of these findings, mixing an excess of Mn with Li during synthesis as in Examples 1 to 4 was observed to be able to improve battery characteristics (and particularly, battery capacity) of the lithium secondary batteries. Furthermore, discharge capacity was only about 100 mAh/g in Comparative Example 2 in which Mn was mixed in excess in the same manner as Examples 1 to 4. This is thought to be because, since the amount of Mn charged was increased excessively in Comparative Example 2, the crystal structure of the positive electrode active material was destroyed, thereby resulting in the formation of $MnO_2$ impurities. On the basis of these findings, the molar ratio (charge ratio) X of Mn/Li at the time of synthesis was determined to suitably be within the range of roughly $1.0<X\leq1.1$. Furthermore, trends similar to that observed in the case of 1/20 C were obtained in charge-discharge tests in which the discharge rate was changed to 1 C and 5 C.

Although the previous descriptions have provided an explanation of preferred embodiments of the present invention, these descriptions are not intended to be limiting, but rather various modifications can naturally also be made.

For example, the technical idea disclosed herein can be similarly applied to an olivine-type lithium manganese phosphate compound of a composition in which a portion of Mn has been substituted with M, and similar actions and effects can be realized.

Namely, according to the present invention, a method is provided for producing a positive electrode active material for a lithium secondary battery composed mainly of an olivine-type lithium manganese phosphate compound, wherein the olivine-type lithium manganese phosphate compound is represented by the following general formula: $Li(Mn_aM_{1-a})_ZPO_4$ (wherein, M represents at least one type selected from the group consisting of Al, Mg, Zr, Nb and Zn, a satisfies the relationship of $0.5<a\leq1$, and Z satisfies the relationship of $1.0<Z\leq1.1$).

In this production method, synthesis is carried out by mixing the lithium source, manganese source and elemental M source used as starting raw materials (similarly to the manganese source, the elemental M alone, an oxide and various types of compounds (for example, an acetate, oxalate or carbonate) can be used) under conditions in which the molar ratio (charge ratio) X of (Mn+M)/Li is set such that $1.0<X\leq1.1$ and $Z\leq X$. In this case, the charge ratio of Mn/M is set so that the Mn/M after production becomes the ratio of the above-mentioned general formula. Normally, Mn/M is set to roughly be the ratio of a/(1−a). In this production method as well, since (Mn+M) is present in excess relative to Li at the time of the synthesized positive electrode active material, loss of Mn that has escaped from the positive electrode active material during assembly can be compensated by this excess amount, thereby making it possible to improve the capacity of a lithium secondary battery.

INDUSTRIAL APPLICABILITY

According to the present invention, a method can be provided for preferably producing a high-performance positive electrode active material (olivine-type lithium manganese phosphate compound) that contributes to the construction of a lithium secondary battery having superior battery characteristics (and particularly, battery capacity).

Figure 8:
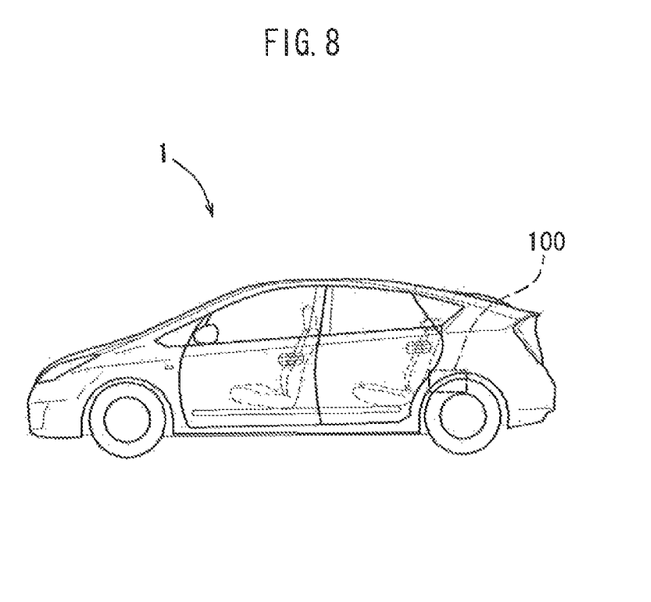
FIG. 8 is a side view schematically showing a vehicle provided with a lithium secondary battery according to an embodiment of the present invention.

Furthermore, any of the lithium secondary batteries 100 disclosed herein is provided with performance (such as that which allows the obtaining of high capacity) suitable for use as a vehicle-mounted battery, and is able to have superior durability with respect to high-rate charging and discharging in particular. Thus, according to the present invention, as shown in FIG. 8, the present invention provides a vehicle 1 provided with any of the lithium secondary batteries 100 disclosed herein. In particular, a vehicle (such as an automobile) is provided that is provided with the lithium secondary battery 100 as a motive power supply (and typically, a motive power supply of a hybrid vehicle or electric vehicle).

The invention claimed is:

1. A lithium secondary battery comprising a positive electrode, wherein
the positive electrode includes an olivine-type lithium manganese phosphate compound as a positive electrode active material,
the olivine-type lithium manganese phosphate compound is a compound represented by the following general formula (I):

$$Li(Mn_aM_{1-a})_ZPO_4 \qquad (I)$$

where, M represents at least one type selected from the group consisting of Al, Mg, Zr, Nb and Zn, a satisfies the relationship of $0.5<a\leq1$, and Z satisfies the relationship of $1.0<Z\leq1.05$, and
is synthesized by mixing starting raw materials, which are a lithium source, a manganese source and an elemental M source, under a condition in which a molar ratio (charge ratio) X of (Mn+M)/Li is set such that 1.01 $X\leq1.05$ and $Z\leq X$, and 1 mol of the phosphorous source is mixed with 1 mol of the lithium source, wherein the synthesis is carried out by a sol-gel method.

2. A lithium secondary battery comprising a positive electrode, wherein
the positive electrode includes an olivine-type lithium manganese phosphate compound as a positive electrode active material,
the olivine-type lithium manganese phosphate compound is a compound represented by the following general formula (II):

$$LiMn_ZPO_4 \qquad (II)$$

where, Z satisfies the relationship $1.0<Z\leq1.05$, and
is synthesized by mixing starting raw materials, which are a lithium source and a manganese source, under a condition in which a molar ratio (charge ratio) X of Mn/Li is set such that $1.01\leq X\leq1.05$ and $Z\leq X$, and 1 mol of the phosphorous source is mixed with 1 mol of the lithium source, wherein the synthesis is carried out by a sol-gel method.

* * * * *